J. KENNEDY.
TOGGLE NUT.
APPLICATION FILED NOV. 6, 1911.
1,036,858.
Patented Aug. 27, 1912.
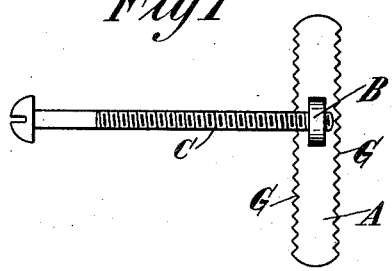
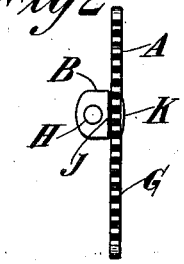
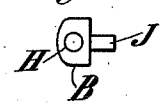
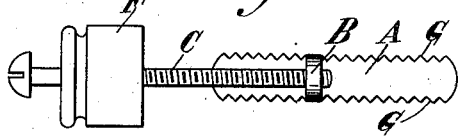
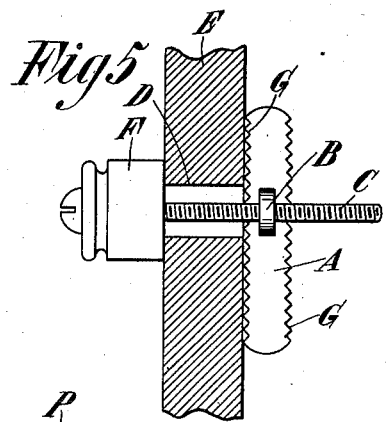
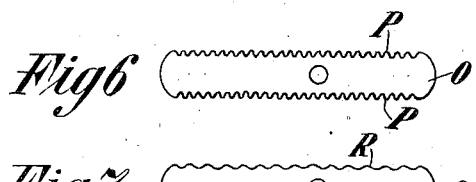
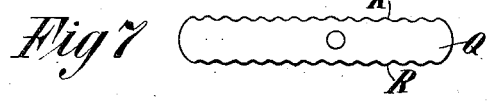
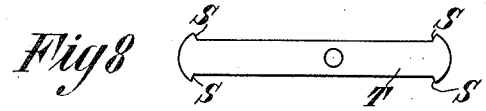
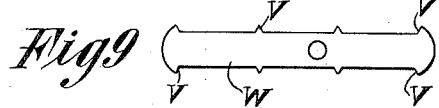
Witnesses:
Joseph Kennedy Inventor
By his Attorney
Herbert G. Ogden

UNITED STATES PATENT OFFICE.

JOSEPH KENNEDY, OF NEW YORK, N. Y.

TOGGLE-NUT.

1,036,858.  Specification of Letters Patent.  Patented Aug. 27, 1912.

Application filed November 6, 1911. Serial No. 658,865.

*To all whom it may concern:*

Be it known that I, JOSEPH KENNEDY, a citizen of the United States, and a resident of the borough of Manhattan, city, county, and State of New York, have invented certain new and useful Improvements in Toggle-Nuts, of which the following is a specification, accompanied by drawings.

This invention relates to toggle nuts used in connection with bolts or screws and adapted to be inserted in an aperture in a wall or the like and form an abutment at the back of the aperture for enabling the screw to be tightened in position.

The present invention is in some respects an improvement on United States Patent No. 800,760, granted Oct. 3, 1905, to Fredric D. Ogden for a toggle nut, and the objects of the present invention are primarily to enable the anchor bar or toggle bar commonly forming a part of the toggle nut to more firmly grip the wall or the like in which the bolt is inserted, reduce the size of the aperture required for the insertion of the toggle nut, and provide a construction in which the position of the center of stress on the toggle nut when the bolt is tightened in place is located with less offset from the axis of the pivot of the anchor bar than in the construction disclosed, for instance in said United States Patent No. 800,760.

The invention is shown in one of its preferred forms in the accompanying drawings, in which—

Figure 1 is a side elevation of a toggle nut and a bolt engaged therein; Fig. 2 is an edge view of the toggle nut; Fig. 3 is a detail side elevation of the bolt engaging nut before attachment to the anchor bar; Fig. 4 is a side elevation of the toggle nut and bolt ready to be inserted in operative position; and Fig. 5 is a side elevation partly in section showing the bolt and toggle nut in position in a wall or other building construction; Figs. 6, 7, 8 and 9 are detail side views of modified forms of anchor bars or toggle bars.

Referring to the drawings, the toggle nut comprises an anchor bar A and bolt engaging means B shown in this instance as a threaded nut proper pivoted on the bar at substantially right angles thereto. The bolt C may be of any suitable construction, the threaded end in this instance being engaged with the nut proper B. The weight of the bar A is preferably unequally distributed at each side of the point of pivotal attachment of the nut B, as by pivoting the nut eccentrically on the bar, so that after inserting the bolt and toggle nut into an aperture D in a wall E with the anchor bar A in alinement with the bolt C, as shown in Fig. 4, the parts will assume the position indicated in Fig. 5, with the bar dropped and extending across the hole.

Fig. 5 illustrates one use of the toggle bolt in securing an insulator F against a wall or the like, and in the operation of tightening the bolt C, the anchor bar A is drawn tightly against the wall.

One important feature of my invention consists in providing means on the anchor bar for enabling said bar to firmly grip the wall as the bolt is tightened, because without gripping means the bar may have a tendency to turn with the bolt and even after the bolt is tightened, the bar may jar loose if the bolt or wall is subject to vibrations.

My anchor bar may be of any suitable construction, but I have shown it formed from a strip of sheet metal in this instance, and by providing the bar with gripping means in the form of teeth or projections on at least one longer edge, said teeth or projections may be forced against or into the body of the wall E, thus preventing the anchor bar from turning and firmly holding it in place. If desired, both longer edges may be serrated or toothed, which insures the engagement of a toothed edge with the wall, as otherwise a workman might adjust the bolt and toggle nut with the smooth edge of the anchor bar abutting against the wall.

Various forms of teeth may be provided on one or both edges of the anchor bar and I have shown several preferred forms by way of illustration. In Figs. 1, 4 and 5, sharp teeth G are shown; in Fig. 6 the anchor bar O is provided with rounded teeth P; in Fig. 7 the bar Q is provided with serrated edges forming teeth R of wave form; in Fig. 8 the teeth S are provided at the ends of the bar T; and in Fig. 9 the teeth V are spaced apart at various points on the edges of the bar W. The gripping action is effective in all these forms of bars, and one form may be found more suitable in a particular case than another form.

The construction of the bolt engaging nut B and its mode of pivotal attachment to the anchor bar A are important features of the invention, as will hereinafter appear. The main body portion of the nut B proper is preferably provided with a threaded aperture H to receive the bolt C, and in the construction shown, a reduced shank J extends outwardly from said main body portion forming the pivot by means of which the anchor bar A is pivoted at substantially right angles to the plane of the nut B. The shank J is inserted through a hole in the anchor bar A and conveniently held in place as by upsetting the end K of the shank or held by any other suitable means. The body portion of the nut B and the shank H both lie in the same plane so that the axis of the pivot passes through the body portion of the nut, and by this means the center of stress on the toggle nut when the bolt is tightened in operative position as in Fig. 5, lies substantially in the plane of the axis of the pivot, instead of being offset therefrom as in the construction disclosed in United States Patent No. 800,760. By my construction the shearing stress on the pivot J is reduced and the anchor bar is not so apt to tip sideways, but remains at substantially right angles to the wall, when the bolt is tightened. The teeth on the edge in contact with the wall also aid in resisting any tendency of the anchor bar to tip, owing to the gripping action of the teeth. Obviously since the nut B proper is brought close up to the anchor bar A and abuts directly against the same, without the use of an intermediate plate or other device, the size of the hole in the wall required for the insertion of the toggle nut is reduced as small as possible.

My improved toggle nut is simple and cheap to manufacture, but is at the same time of increased strength and of greater efficiency than devices of similar character. It is to be further understood that the invention is not limited to the construction shown in the drawings, which are illustrative only of one preferred form of the invention, and the valuable features of the device may be applied in different forms of toggle nuts.

I claim and desire to obtain by Letters Patent the following:

1. A toggle bar adapted to be connected to a bolt and be inserted through an aperture in a wall or other building construction to form an abutment for the bolt at the back of the aperture, comprising a flat metal plate having greater width than thickness eccentrically pivoted at substantially right angles to the axis of the bolt, and provided with gripping projections at the ends on one longer straight edge, the plane of the toggle bar being adapted to extend at an angle to the back of the wall, with the projections firmly gripping the face of the wall at each side of the aperture to hold the toggle bar in defined position as the bolt is tightened and to resist twisting forces in a plane substantially parallel to the plane of contact between the wall and the edge provided with the gripping projections.

2. A toggle nut comprising a toggle bar, and a bolt engaging nut pivoted to the toggle bar at substantially right angles thereto, by means of a pivot lying in the plane of said nut, whereby the center of stress on the device in operation lies substantially in the plane of the axis of the pivot.

3. A toggle nut comprising a toggle bar, and a bolt engaging nut provided with a reduced shank extending in the plane of said nut, the toggle bar being pivoted on said reduced shank, whereby the center of stress on the device in operation lies substantially in the plane of the axis of the pivot.

In testimony whereof I have signed this specification in the presence of two subscribing witnesses.

JOSEPH KENNEDY.

Witnesses:
 I. B. MOORE,
 M. KEMPE.